(12) United States Patent
Beal

(10) Patent No.: US 7,712,751 B2
(45) Date of Patent: May 11, 2010

(54) LAWN MOWER SULKY

(76) Inventor: Renn Allen Beal, 5505 Dutch Lane Rd., Johnstown, OH (US) 43031

( * ) Notice: Subject to any disclaimer, the term of this patent is extended or adjusted under 35 U.S.C. 154(b) by 409 days.

(21) Appl. No.: 11/873,341

(22) Filed: Oct. 16, 2007

(65) Prior Publication Data

US 2009/0096178 A1   Apr. 16, 2009

(51) Int. Cl.
  *B62D 63/06* (2006.01)
  *B60D 1/00* (2006.01)
  *A01B 69/00* (2006.01)
(52) U.S. Cl. ............... 280/32.7; 280/493; 172/257; 172/433
(58) Field of Classification Search ............ 280/32.7, 280/493, 124.145, 124, 154, 164, 124.179; 172/433, 257, 329, 678; 56/11.1–11.4, 14.9, 56/15.4, 15.5, 16.7
See application file for complete search history.

(56) References Cited

U.S. PATENT DOCUMENTS

| 1,222,796 | A |   | 4/1917  | Raney              |         |
|-----------|---|---|---------|--------------------|---------|
| 1,262,957 | A |   | 4/1918  | Kemper             |         |
| 4,828,282 | A | * | 5/1989  | Pinto              | 280/32.7|
| 4,998,948 | A |   | 3/1991  | Osterling          |         |
| 5,183,279 | A |   | 2/1993  | Acerno et al.      |         |
| 5,308,092 | A |   | 5/1994  | Kiraly             |         |
| 5,321,939 | A |   | 6/1994  | Fuse et al.        |         |
| 5,413,364 | A | * | 5/1995  | Hafendorfer        | 280/32.7|
| 5,947,505 | A | * | 9/1999  | Martin             | 280/493 |
| 6,062,582 | A | * | 5/2000  | Martin             | 280/493 |
| 6,085,502 | A |   | 7/2000  | Wians et al.       |         |
| 6,098,385 | A |   | 8/2000  | Turk               |         |
| 6,105,348 | A |   | 8/2000  | Turk et al.        |         |
| 6,155,033 | A |   | 12/2000 | Wians et al.       |         |
| 6,170,242 | B1 |  | 1/2001  | Gordon             |         |
| 6,199,354 | B1 |  | 3/2001  | King et al.        |         |
| 6,205,753 | B1 |  | 3/2001  | Velke et al.       |         |
| 6,234,495 | B1 | * | 5/2001 | Velke              | 280/32.7|
| 6,438,930 | B1 |  | 8/2002  | Velke et al.       |         |
| 6,488,291 | B1 | * | 12/2002| Bellis, Jr.        | 280/32.7|
| 6,490,849 | B1 |  | 12/2002 | Scag et al.        |         |
| 6,499,282 | B1 |  | 12/2002 | Velke et al.       |         |
| 6,560,952 | B2 |  | 5/2003  | Velke et al.       |         |
| 6,637,760 | B1 | * | 10/2003| Carman             | 280/32.7|
| 6,688,089 | B2 |  | 2/2004  | Velke et al.       |         |
| 6,830,256 | B2 | * | 12/2004| Bryant             | 280/124.106|
| 6,935,092 | B2 |  | 8/2005  | Velke et al.       |         |
| 2007/0114747 | A1 | * | 5/2007 | Morgan           | 280/124.135|

* cited by examiner

*Primary Examiner*—Glenn Dayoan
*Assistant Examiner*—John R. Olszewski
(74) *Attorney, Agent, or Firm*—Ronald J. Koch

(57) ABSTRACT

An improved lawn mower sulky comprises platform 10, hitch support arm 20, first stub axle 40, first axle A-frame 41, first damper assembly 60, second stub axle 70, second axle A-frame 71, and second damper assembly 80.

11 Claims, 3 Drawing Sheets

LAWN MOWER SULKY

BACKGROUND AND SUMMARY

The present invention relates generally to lawn mowing and specifically to walk behind mowers utilizing a stand up sulky. Walk behind lawn mowers and stand up sulkies are known. Conventional sulkies are problematic in that they have fixed axles, no dampening means (shock absorbers and the like), and are generally rectangular in shape. Additionally, they do not have convenient means for applying upward force from the user's foot to affect the turning ability of the sulky; nor do they have the axles positioned such that the weight of the user does not exert an undesirable torque upon the mower to which it is attached; nor do they provide a platform for a user to stand on that is deep enough and long enough to accommodate users with large feet. The invention presented herein overcomes these and other disadvantages as will be appreciated by those in the art.

REFERENCE NUMERALS IN DRAWINGS

Figure 1:
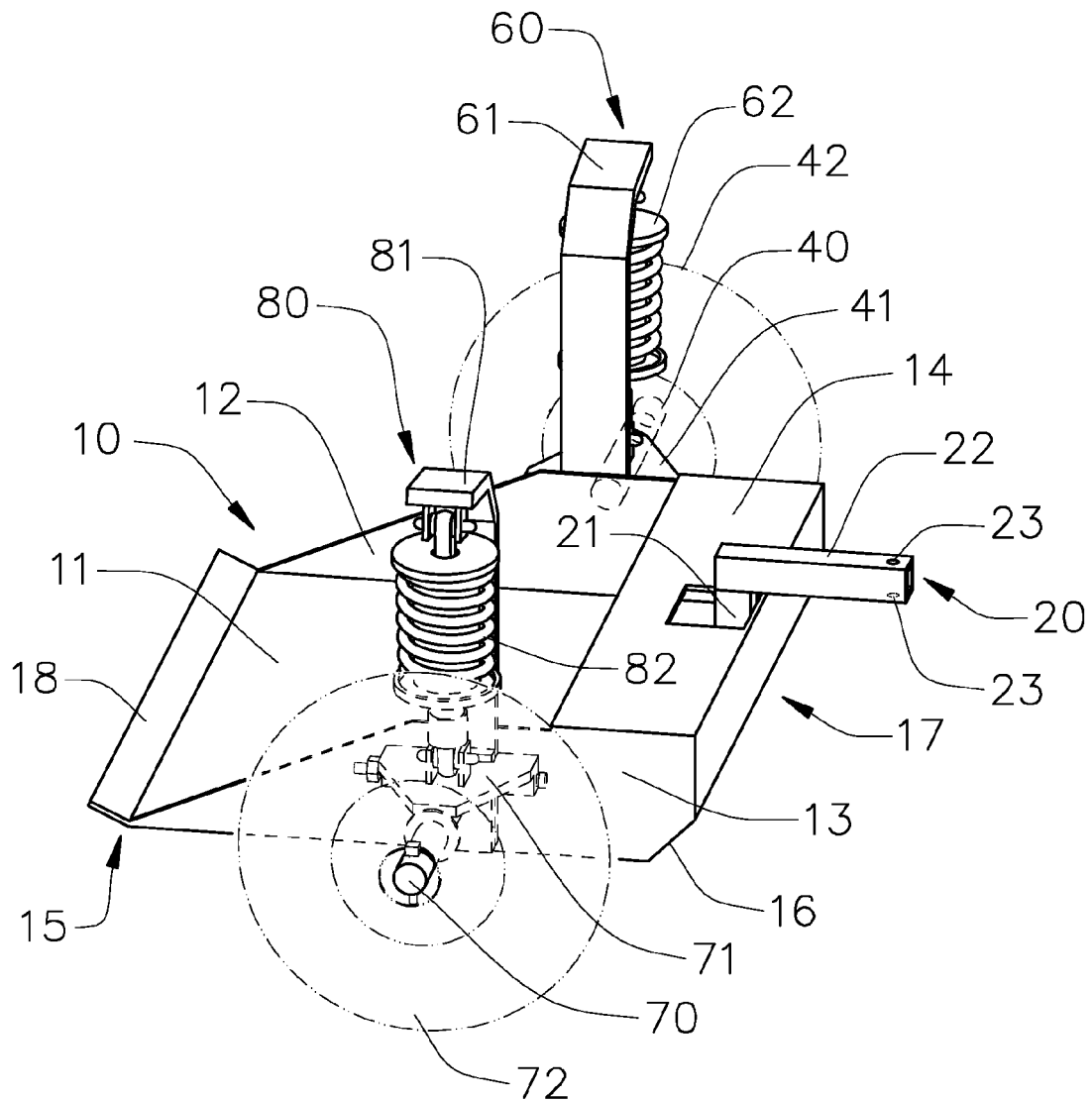
FIG. 1 depicts a perspective view of the invention

The table below lists the reference numerals employed in the figures, and identifies the element designated by each numeral.

10 platform 10
11 platform bottom 11
12 platform first side 12
13 platform second side 13
14 platform top 14
15 platform rear end 15
16 platform tapered portion 16
17 platform front end 17
18 flange 18
20 hitch support arm 20
21 support arm vertical member 21
22 support arm horizontal member 22
23 mounting hole 23
40 first stub axle 40
41 first axle A-frame 41
42 first wheel 42
60 first damper assembly 60
61 first damper support bracket 61
62 first damper 62
70 second stub axle 70
71 second axle A-frame 71
72 second wheel 72
80 second damper assembly 80
81 second damper support bracket 81
82 second damper 82

DETAILED DESCRIPTION

Figure 2:
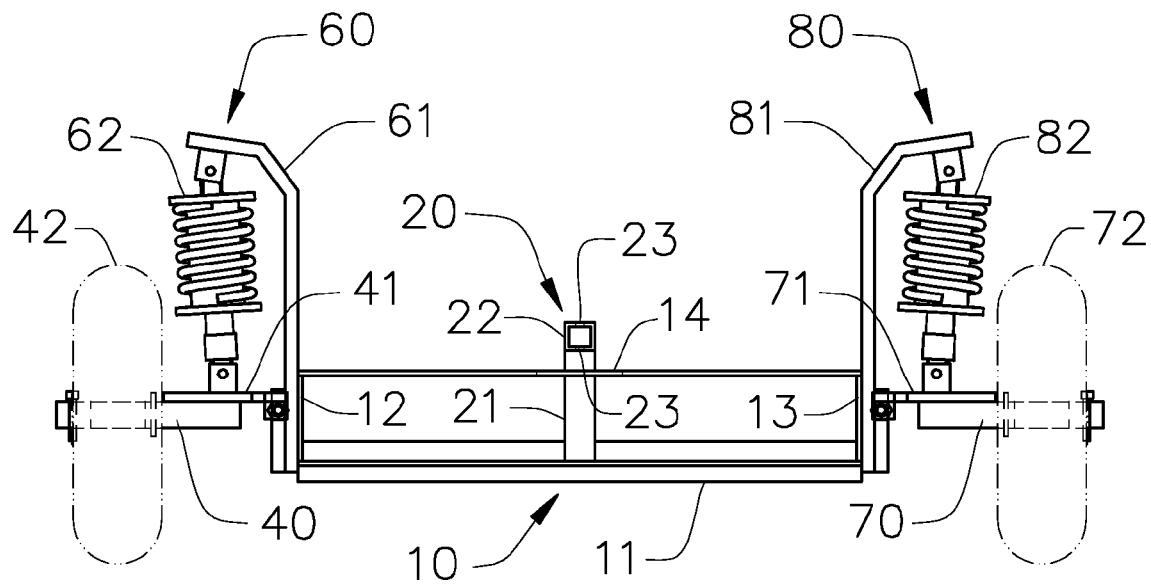
FIG. 2 depicts a front view of the invention
Figure 3:
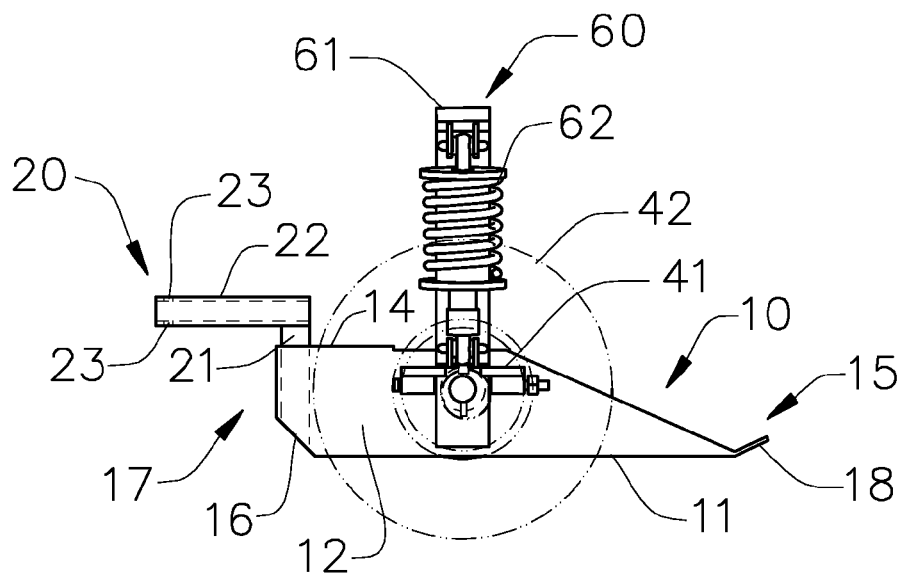
FIG. 3 depicts a side view of the invention
Figure 4:
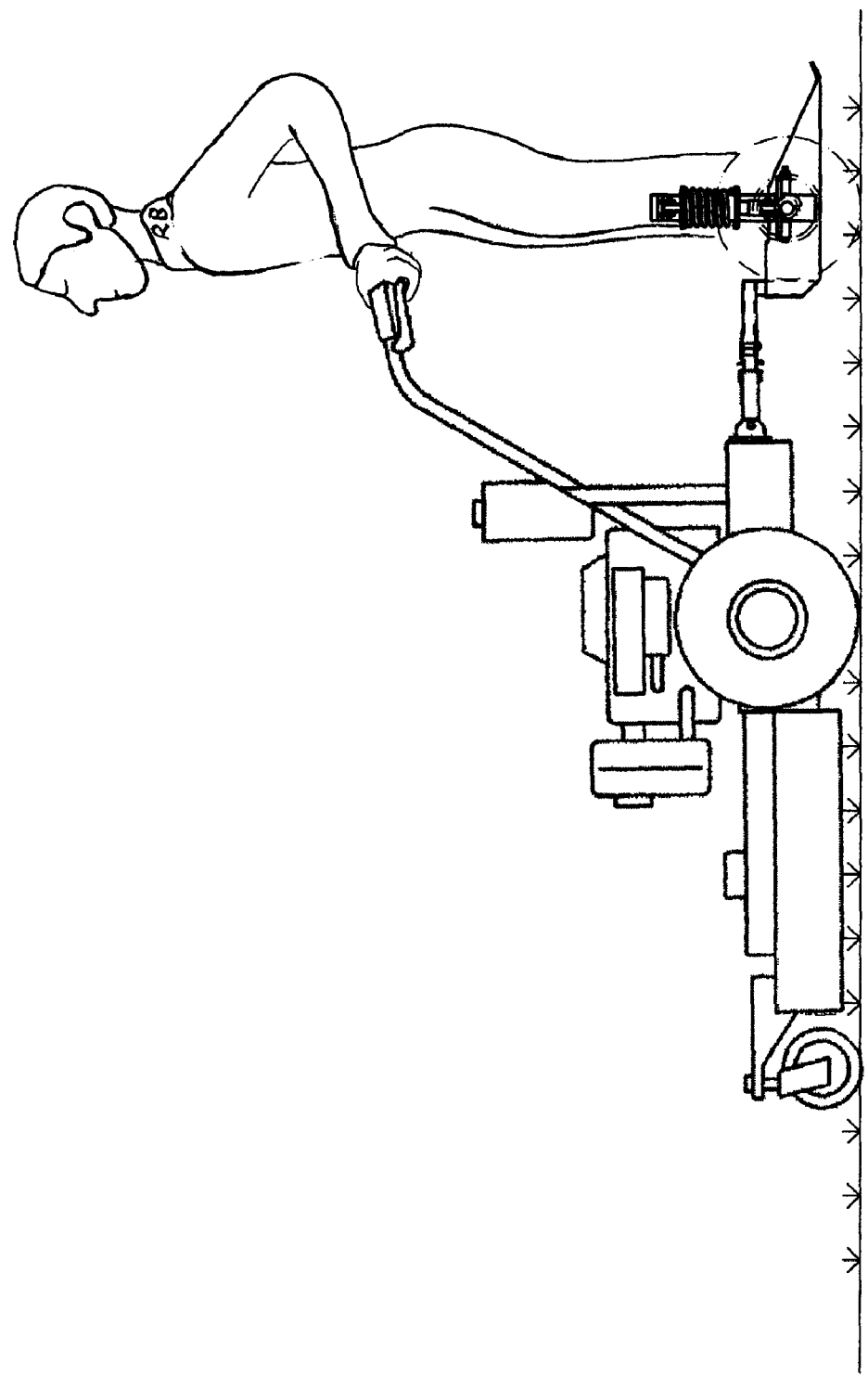
FIG. 4 depicts a side view of the invention in use

As shown in FIGS. 1-4, a preferred embodiment of the present invention comprises platform 10, hitch support arm 20, first axle A-frame 41, first stub axle 40, first damper assembly 60, second axle A-frame 71, second stub axle 70, and second damper assembly 80.

Platform 10 comprises bottom 11, first side 12, second side 13, front end 17, tapered portion 16, rear end 15, and top 14.

Platform bottom 11 is preferably flat except for upwardly facing flange 18 which is disposed proximate rear end 15. The purpose of flange 18 is to prevent the rear end 15 from getting caught in the ground and hitting objects when the sulky is moving backwards.

As depicted, first side 12 and second side 13 taper downward towards platform rear end 15 and are vertically oriented preferably perpendicular to platform bottom 11. Platform bottom 11 can be made to have a textured surface to improve the grip of the user's shoes on the device while in use.

Front end 17 has tapered portion 16, which is preferably disposed at a 45 degree angle relative to bottom 11. Sides 12 and 13 have an angled edge at the front where they meet front end 17. The 45 degree angle is preferred. However, the precise angle is not critical so long as the spirit of the invention is not compromised; to wit, providing an angled surface (as opposed to a vertical surface) to facilitate circumnavigation of large objects.

Platform top 14 is preferably perpendicular to front end 17, and substantially parallel with platform bottom 11. First side 12 and second side 13 are preferably at least three inches in height at the highest portion. Platform 10 is preferably thirteen inches in length, from front end 17 to rear end 15. These dimensions are preferred but not essential. It is preferred to provide a platform for a user to stand on that is deep enough and long enough to accommodate users with large feet.

Platform 10 is preferably formed from a unitary sheet of material, where sides 12 and 13, front end 17, and top 14 are fabricated into place by bending or other shaping means. The free edges of the platform faces could be joined together by welding or other fastening means. Platform 10 is preferably made of heavy gauge sheet metal, but could also be made or molded in one piece of other materials such as heavy plastic, fiberglass, or even wood.

Hitch support arm 20 has support arm vertical member 21 and support arm horizontal member 22. Vertical member 21 is fixedly secured to front end 17 by welding or other fastening means, and extends upward to a level higher than top 14, and projects through an opening in top 14. As will be appreciated, other means of attaching the invention to a mower are possible provided the platform may freely rotate within the range of movement of the mower.

Horizontal member 22 is fixedly secured to vertical member 21 by welding or other fastening means, is cantilevered from front end 17, and is operative to engage a conventional mower or other powered lawn and garden equipment. Walk behind mowers are known as are the sulkies that are used with them. It is also known that mowers from different manufacturers have different requirements for mounting sulkies. As such, the interconnectivity, or operative engagement, between the invention and various mowers and the present invention will be apparent.

Hitch support arm 20, axle A-frames 41 and 71, stub axles 40 and 70, and damper support brackets 61 and 81 can be made of metal or other material having similar strength and rigidity characteristics such as composite or some plastic materials.

First axle A-frame 41 is hingedly secured to first side 12, and first stub axle 40 is fixedly secured at one end to first axle A-frame 41 by welding or other fastening means, and the other end is operative to engage first wheel 42.

First damper assembly 60 comprises first damper support bracket 61 and first damper 62. First damper support bracket 61 is fixedly secured to first side 12 by welding or other fastening means. First damper 62 is removably engaged to first damper support bracket 61 at its top end and to first axle A-frame 41 and its bottom end.

Second axle A-frame 71 is hingedly secured to second side 13, and second stub axle 70 is fixedly secured at one end to second axle A-frame 71 by welding or other fastening means, and the other end is operative to engage second wheel 72. As will be apparent, means for hingedly securing first and second A-frames 41, 71 to first and second sides 12, 13 respectively, can be accomplished in various ways. A preferred embodiment comprises welding a metal tube to the side through which a cotter pin (or bolt) is placed. The hole is coaxial with a hole disposed in the A-frame member. Thus, the A-frame hingedly moves with respect to the side. Such methods are known.

Second damper assembly 80 comprises second damper support bracket 81 and second damper 82. Second damper support bracket 81 is fixedly secured to second side 13 by welding or other fastening means. Second damper 82 is removably engaged at its top end to second damper support bracket 81 and at its bottom end to second axle A-frame 71.

A significant advantage is achieved by having the stub axles connected to the A-frames. This facilitates easy replacement of the axles. Conventional sulkies have the axles connected to the carriage portion. Thus, when the axles become bent, there is no easy way to replace them. This frequently results in having to replace the entire sulky.

First and second dampers 62 and 82 preferably comprise a coiled spring disposed about a shaft. A preferred embodiment comprises using off the shelf dampers such as are used on mountain bikes. As will be apparent, other types of dampers (e.g. hydraulic or air cylinder) may be used.

First and second dampers 62 and 82 preferably have means for adjusting the dampening force thereof. This is advantageous to allow users of differing weights to make appropriate adjustments. A preferred embodiment comprises using off the shelf dampers that incorporate a threaded shaft and bolt arrangement whereby the bolt is moved up and down the shaft thus changing the force of the coil spring. Such apparatus are widely known.

In use, horizontal member 22 may be engaged to a conventional walk-behind grass mower or other powered lawn and garden equipment. The user may stand upright on platform 10 while operating the mower, and be towed behind it, while gripping the handle or handles of the mower with their hands for control and balance. Platform top 14 in advantageous in that it provides a surface upon which a user may exert upward force through the feet in such a way as to facilitate turning the sulky along with the mower.

The dampers 62 and 82 act to reduce the vibration of platform 10 while the user is being towed over uneven terrain, thereby increasing the comfort of the user by lessening the wear and stress on their legs as well as lessening wear on the invention.

The location of stub axles 40 and 70 (and hence, first and second A-frames 41, 71) is designed such that the weight of the user is preferably centered over the stub axles 40 and 70. This design aligns the support force of wheels 42 and 72 with the user's distributed weight, thus lessening the resultant torque that would otherwise be transferred through hitch support arm 20 to the mower fastening point. Such torque is disadvantageous because the rear end of the mower would otherwise be unnecessarily forced upward or downward. The axle is preferably located approximately five and three quarter (5¾) inches from front 17.

Platform 10 has a width and depth as required to accommodate a user having large feet and/or workboots. Platform top 14 also helps users maintain their balance by serving as a bracing surface to press the tops of their feet against.

It should be noted that various features of the present invention do not have to be mutually present in combination to achieve the invention. For instance, tapered portion 16, flange 18, platform top 14, can all exist together or independently. Moreover, first and second damper assemblies 60, 80 do not have to be incorporated. The same is true for the positioning of the A-frames so as to minimize torque on a mower to which the invention is attached.

What is claimed is:

1. An improved lawn mower sulky comprising:
a platform having a bottom, first and second sides, a front end, a rear end, and a top,
said platform top being substantially parallel with said bottom;
a hitch support arm having a vertical member, and an horizontal member,
said vertical member being fixedly secured to said platform front end, and extending upwardly higher than said top, and extending through an opening in said top,
said horizontal member being fixedly secured to said vertical member and cantilevered from said front end operative to engage a mower;
a first axle A-frame, being hingedly secured to said first side;
a first stub axle being fixedly secured to said first axle A-frame, said first stub axle being operative to engage a wheel;
a first damper assembly comprising a first damper support bracket and a first damper;
said first damper support bracket being fixedly secured to said first side;
said first damper being removably engaged to said first damper support bracket and said first axle A-frame;
a second axle A-frame, being hingedly secured to said second side;
a second stub axle being fixedly secured to said second axle A-frame, said second stub axle being operative to engage a wheel;
a second damper assembly comprising a second damper support bracket and a second damper;
said second damper support bracket being fixedly secured to said second side;
said second damper being removably engaged to said second damper support bracket and said second axle A-frame.

2. The apparatus of claim 1 further comprising:
said platform further comprising
said front end having a tapered portion being disposed at a 45 degree angle relative to said bottom;
said bottom being substantially flat and having an upwardly disposed flange proximate said rear end.

3. The apparatus of claim 1 further comprising:
said sides being tapered narrower towards said rear end and positioned substantially perpendicular to said bottom.

4. The apparatus of claim 1 further comprising:
said platform top having a longitudinal length of approximately four inches.

5. The apparatus of claim 1 further comprising:
said sides being at least three inches high at the highest portion thereof.

6. The apparatus of claim 1 further comprising:
said platform being substantially thirteen inches in length.

7. The apparatus of claim 1 further comprising:
said platform being formed from a unitary sheet of material.

8. The apparatus of claim 1 further comprising:
said first and second stub axles being substantially coaxial and positioned substantially near the middle of said platform bottom wherein the weight of a user is centered thereon.

9. The apparatus of claim 1 further comprising:
said first and second dampers comprising a coiled spring disposed about a shaft;
said first and second dampers having means for adjusting the dampening force thereof.

10. The apparatus of claim 1 further comprising:
said platform further comprising
said front end having a tapered portion being disposed at a 45 degree angle relative to said bottom,
said bottom being substantially flat and having an upwardly disposed flange proximate said rear end;
said sides being tapered narrower towards said rear end and positioned substantially perpendicular to said bottom;
said platform top having a longitudinal length of approximately four inches;
said sides being at least three inches high at the highest portion thereof;
said platform being substantially thirteen inches in length;
said platform being formed from a unitary sheet of material;
said first and second stub axles being substantially coaxial and positioned substantially near the middle of said platform bottom wherein the weight of a user is centered thereon;
said first and second dampers comprising a coiled spring disposed about a shaft;
said first and second dampers having means for adjusting the dampening force thereof.

11. An improved lawn mower sulky comprising:
a platform having a bottom, first and second sides, a front end, a rear end, and a top,
said bottom being substantially flat and having an upwardly disposed flange proximate said rear end,
said sides being tapered narrower towards said rear end and positioned substantially perpendicular to said bottom,
said front end having a tapered portion being disposed at a 45 degree angle relative to said bottom,
said platform top being substantially parallel with said bottom and having a longitudinal length of approximately four inches,
said sides being at least three inches high at the highest portion thereof,
said platform being substantially thirteen inches in length,
said platform being formed from a unitary sheet of material;
a hitch support arm having a vertical member, and an horizontal member,
said vertical member being fixedly secured to said platform front end, and extending upwardly higher than said top, and extending through an opening in said top,
said horizontal member being fixedly secured to said vertical member and cantilevered from said front end operative to engage a mower;
a first axle A-frame, being hingedly secured to said first side;
a first stub axle being fixedly secured to said first axle A-frame, said first stub axle being operative to engage a first wheel;
a first damper assembly comprising a first damper support bracket and a first damper;
said first damper support bracket being fixedly secured to said first side;
said first damper being removably engaged to said first damper support bracket and said first axle A-frame;
a second axle A-frame, being hingedly secured to said second side;
a second stub axle being fixedly secured to said second axle A-frame, said second stub axle being operative to engage a second wheel;
a second damper assembly comprising a second damper support bracket and a second damper;
said second damper support bracket being fixedly secured to said second side;
said second damper being removably engaged to said second damper support bracket and said second axle A-frame;
said first and second dampers comprising a coiled spring disposed about a shaft;
said first and second dampers having means for adjusting the dampening force thereof;
said first and second stub axles being substantially coaxial and positioned substantially five and three quarter inches from said platform front;
whereby said horizontal member may be engaged to a walk behind lawn mower and a user may stand on said platform while operating said mower.

\* \* \* \* \*